April 23, 1968      A. GUGLIELMI      3,379,957

A.C. BATTERY-CHARGING GENERATOR WITH REGULATING SYSTEM

Filed July 6, 1965      2 Sheets-Sheet 2

United States Patent Office 3,379,957
Patented Apr. 23, 1968

3,379,957
A.C. BATTERY-CHARGING GENERATOR WITH REGULATING SYSTEM
Antonio Guglielmi, Bologna, Italy, assignor to Ducati Elettrotecnica S.p.A., Bologna, Italy
Filed July 6, 1965, Ser. No. 469,787
Claims priority, application Italy, July 6, 1964, 15,371/64
7 Claims. (Cl. 322—29)

The present invention relates to an electric A.C. generator having an automatic static regulator particularly but not exclusively for battery charging.

In special plants such as those on board land and air vehicles, there is a great need for battery re-charging means which, besides guaranteeing maximum safety and working life, are as light and small in size as possible. The most recent types of apparatus consist substantially of an alternating current generator and a voltage regulator and/or charging current. It is clear that automatic regulation of battery charging must be possible over a very wide range of generator speeds since, as we know, this may rapidly and frequently vary between a few hundred and a few thousands revolutions per minute during normal motor-vehicle operation.

An object of the present invention is to provide an improved A.C. generator and accordingly the invention consists in an electric three-phase A.C. generator in combination with a regulator for battery recharging, comprising a rotor containing permanent magnets and a stator having three principal power windings Y-connected to each other and three auxiliary windings Y-connected to each other; the said principal windings being connected to a three-phase bridge formed by three rectifier diodes and three controlled diodes adapted to be controlled by the three auxiliary windings respectively.

Preferably the auxiliary windings are connected in phase opposition to the principal windings and are located in the immediate vicinity of the air gap defined between the stator and the rotor.

Preferably the centre of the Y connection of the auxiliary windings is connected through a switch to the positive common pole of the said three controlled diodes, the other ends of the auxiliary windings being connected through saturable reactors and three small diodes respectively to the grid of the three controlled diodes respectively.

It is is desirable that the generator and regulator be combined in a single light body.

Other purposes and advantages will be evident from the following description and the accompanying drawings which illustrate, by way of example, one embodiment of the invention.

Figure 4:
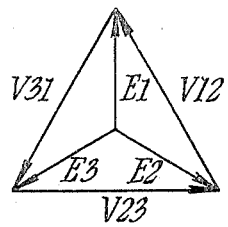
Figure 5:
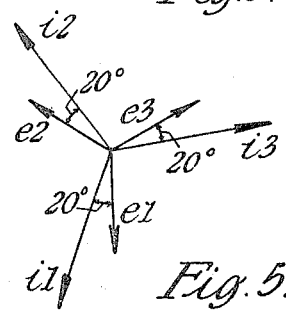
Figure 6:
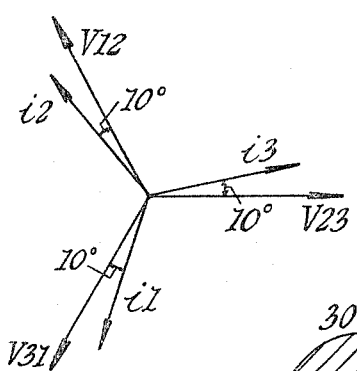
Figure 7:
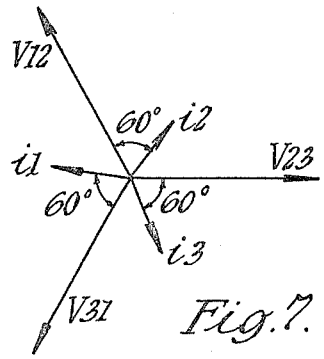
Figure 8:
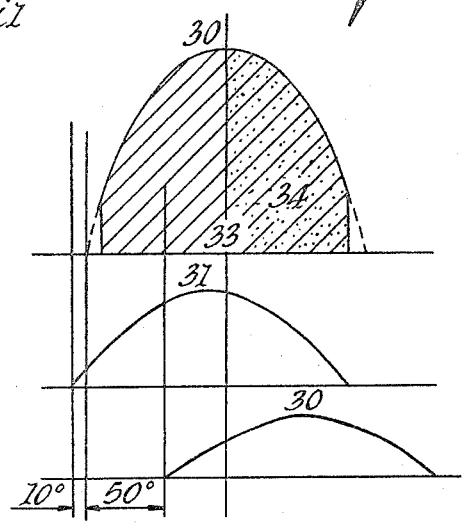

FIGURE 4 reproduces the vectorial diagram of the line voltages of the generator power phases;

FIGURE 5 shows the vectorial diagram of the auxiliary phase voltages;

FIGURE 6 shows the vectorial diagram obtained by superposing the diagram of FIGURE 5 on FIGURE 4;

FIGURE 7 illustrates the vectorial diagram of the line voltages and of the magnetising currents alone should the reactors become completely desaturated;

FIGURE 8 represents the progress of a half wave relative to one of the three phases in different operating conditions of the apparatus.

Figure 1:
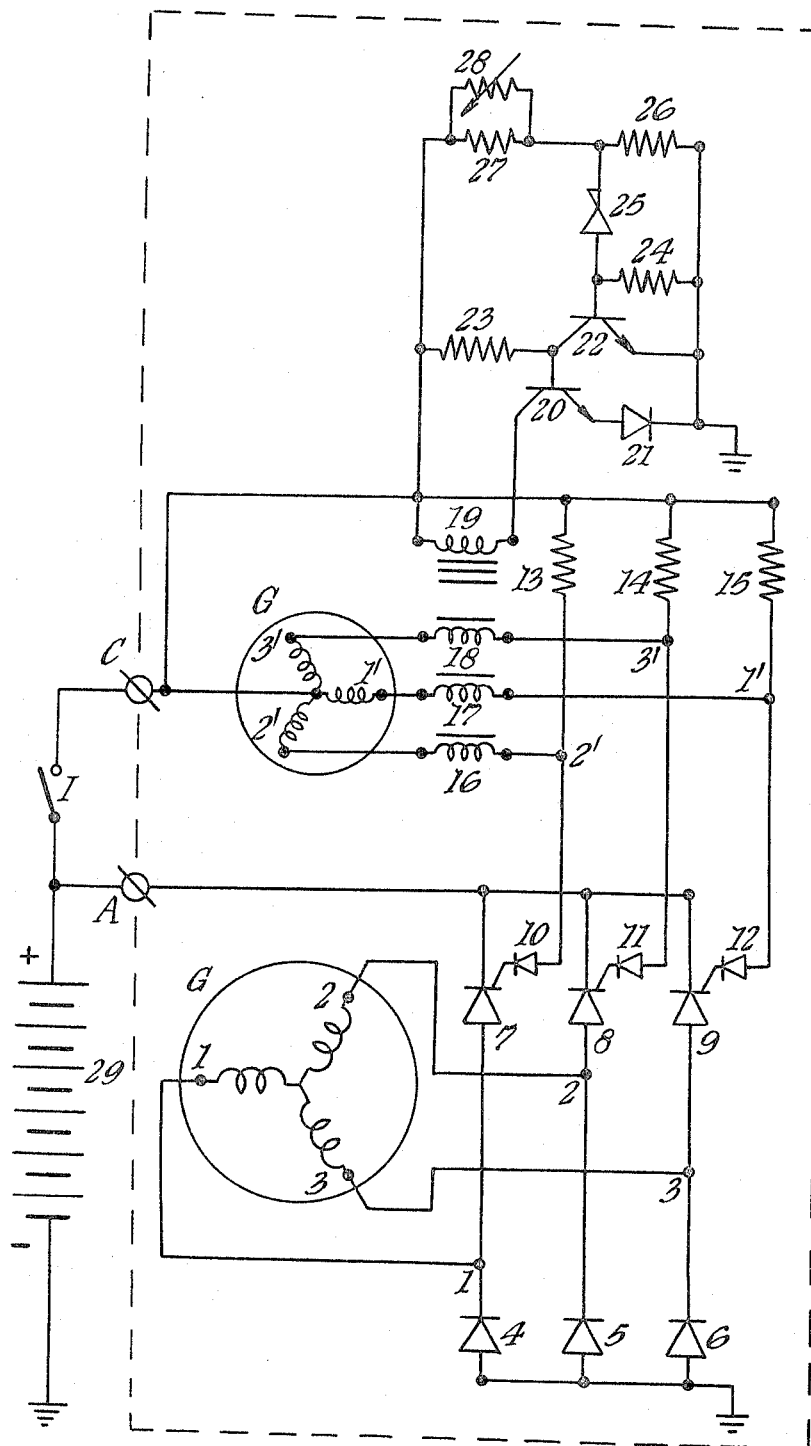
FIGURE 1 is a drawing of the apparatus, with particular atention being given to the three-phase electric generator G and to the windings of the three main phases as well as the three auxiliary phases with the connections forming the generator and regulator circuit.
Figure 2:
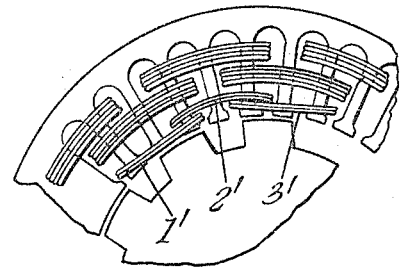
FIGURE 2 is a partial view of the arrangement of the three auxiliary windings in respect of the principal ones and of the lamellar pack of the stator.

The generator, G, consists of a permanent-magnet rotor and a stator bearing the power windings 1, 2 and 3, and the auxiliary windings 1', 2' and 3'. The position of these auxiliary windings is particularly important and is shown in the view of FIGURE 2. They are placed as near as possible to the air gap because, so arranged, the three auxiliary phases are able to produce a current which, in tension, is independent of the charge delivered by the principal phases 1, 2 and 3. As can be seen in the diagram of FIGURE 1, the auxiliary windings 1', 2' and 3' are Y-connected and are in phase opposition to the power windings 1, 2 and 3. The power windings go to a three-phase bridge formed by the three silicon rectifier diodes 4, 5 and 6, and the three controlled diodes 7, 8 and 9.

The Y centre, 0, is connected by means of terminals C and A and switch I to the positive common pole of the three controlled diodes; the ends of the Y, 1', 2' and 3', go to the three controlled diode grids, through three saturable refractors, 16, 17 and 18 and three small silicon diodes, 10, 11 and 12.

Figure 3:
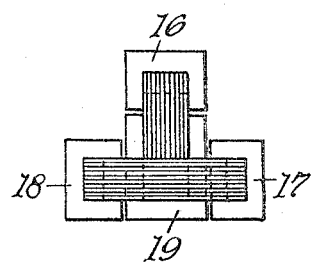
FIGURE 3 is a cylinder-head view of the arrangement of the three saturable reactors and the saturation control coil.

The three saturable reactors are placed as shown in FIGURE 3, this arrangement being very important from the point of view of economy and compactness of the product.

The outlet ends of the three reactor windings are, besides, connected to the Y of resistances 13, 14 and 15 which is thus in parallel with the other formed by diode 10 and the relative connection of the grid of controlled diode 7, diode 11 and the relative grid of diode 8, and diode 12 and the grid of diode 9.

Winding 19, which controls the degree of saturation of the three reactors 16, 17 and 18, is piloted by the amplifier which consists fundamentally of the two silicon transistors, 20 and 22, and Zener diode 25.

Suppose now that battery 29 is charged, the generator running at a certain speed and that the switch, I, is turned off.

In such conditions the voltage across the battery is very high, so the resistive tension dividers 27, 28 and 26 gives a voltage higher than that of its threshold to the Zener diode 25, with the result that transistor 22 is saturated, thus interdicting transistor 20.

Resistance 24 serves to eliminate the uncertain characteristic tract of the Zener diode near the bend where inconstant production values might be found.

By the voltage drop across it the silicon rectifier 21 compensates the fall of transistor 22, with a consequently more definite interdiction of transistor 20. Winding 19, therefore, is not traversed by a current, while windings 16, 17 and 18 allow only a very low magnetized current to pass through them, this being immediately carried to the resistance Y 13, 14 and 15; since the direct resistance of diodes 10, 11 and 12 is far too high for such voltages (drop of $2/10$ or $3/10$ volt across resistances 13, 14 and 15).

It should be noted that the very nature of the reactors makes quite certain that the said magnetization current remains constant on variation of the alternator rotation speed, and ensures that the regulation is independent of speed; indeed, the current passing through the reactances does not vary since, the alternator being of the constant excitation type, voltage increases in proportion to the frequency.

Thus there exist conditions of perfect interdiction of the three controlled diodes 7, 8 and 9 and, consequently, the battery is not subject to charge.

Suppose now that battery 29 is uncharged; the Zener threshold is not exceeded, therefore the interdiction of transistor 22 produces saturation in transistor 20; a continuous current passes through winding 19 and brings about the saturation of the three reactors 16, 17 and 18.

In this way the current of the auxiliary windings increases sufficiently to carry, through diodes 10, 11 and 12, the energy necessary to prime controlled diodes 7, 8 and 9.

In these conditions, which are those of delivery and maximum power—given also the proportioning of the reactor windings—the currents going to the grids may be considered out of phase by about 20° delay with the star voltages of the auxiliary phases; FIGURE 5 shows the vectorial diagram of the auxiliary phase voltages $e1$, $e2$ and $e3$ of the maximum excitation currents $i1$, $i2$ and $i3$.

From this, by superposing the vectorial diagrams of the line voltages of power phases V12, V23 and V31 (see FIGURE 4) on the grid currents of FIGURE 5, the result is the vectorial diagram of FIGURE 6, which clearly indicates the course of the line voltages on the controlled diodes and of the priming current in the delivery of maximum energy. The excitation currents, slightly in advance compared to the anode voltages, give a better guarantee of the priming of the controlled diodes.

FIGURE 7, on the contrary, represents the vectorial diagram of the line voltages and the magnetization currents only, when the reactors are in a state of complete desaturation. These currents, being unable to cross the threshold of diodes 10, 11 and 12, cannot prime the controlled diodes.

Now, as the battery voltage increases through charging, thus diminishing the degree of saturation of reactors 16, 17 and 18, the excitation current drops on the one hand, making priming of the controlled diodes less probable while, on the other, a delay is generated (due to the growth of the L/R ratio of the reactor windings) on the excitation currents limiting the amplitude of the priming angle on the linked half-wave until a condition of complete interdiction of quite desaturated reactors is reached.

FIGURE 8 shows the course of a half-wave relative to one of the three phases; curve 30 represents the line voltages acting on one of the controlled diodes in the direct sense; curve 31 represents the excitation current relative to the diode considered in maximum excitation conditions and curve 32 at an intermediate working condition.

In the first condition current output will be complete—the whole shaded area 33; in the second condition, on the other hand, output will be relative to dotted area 34 only.

Curve 32 illustrates an intermediate charging state with a phase displacement of 50°.

The present invention, illustrated and described by way of example must be considered as extending to variations which, as such, come within the scope of the appended claims.

I claim:

1. An electric three-phase A.C. generator in combination with a regulator for battery recharging, comprising a rotor containing permanent magnets and a stator having three principal power windings Y-connected to each other and three auxiliary windings Y-connected to each other; the said principal windings being connected to a three-phase bridge formed by three rectifier diodes and three controlled diodes, and means for connecting said three Y-connected auxiliary windings to said three controlled diodes with each controlled diode connected respectively to one of said auxiliary windings.

2. An electric generator as claimed in claim 1 wherein the said auxiliary windings are connected in phase opposition to the principal windings and are located in the immediate vicinity of the air gap defined between the stator and the rotor.

3. An electric generator as claimed in claim 1 the centre of the Y-connection of the auxiliary windings is connected through a switch to the positive common pole of the said three controlled diodes, the other ends of the auxiliary windings being connected through saturable reactors and three small diodes respectively to the grid of the three controlled diodes respectively.

4. An electric generator as claimed in claim 3 wherein the three saturable reactors are connected in parallel and disposed in a triangular arrangement and a reactor saturation control coil is located in the centre of this arrangement.

5. An electric generator as claimed in claim 3 wherein a corresponding Y of three resistances is connected in parallel with the Y formed by the three small diodes connected to the grids of the corresponding controlled diodes.

6. A regulator for a generator as claimed in claim 4 including an amplifier comprising a first transistor connected to said saturation control winding of the three reactors for controlling the energization of said saturation control winding, means including a second transistor connected for controlling said first transistor, and means including a Zener diode connected for response to predetermined voltage conditions of the battery being charged for controlling said second transistor.

7. An automatic static regulator as claimed in claim 6 for an electric generator, wherein the said regulator for automatic regulation is contained in the body of the electric generator itself.

References Cited

UNITED STATES PATENTS

| 3,068,393 | 12/1962 | Blackburn | 322—28 |
| 3,254,293 | 5/1966 | Steinbruegge et al. | 322—28 X |
| 3,209,235 | 9/1965 | Roof | 322—28 |
| 3,320,509 | 5/1967 | Guglielmi | 320—61 X |

MILTON O. HIRSHFIELD, *Primary Examiner.*

R. V. LUPO, *Assistant Examiner.*